(12) United States Patent
Colson et al.

(10) Patent No.: US 7,522,718 B2
(45) Date of Patent: *Apr. 21, 2009

(54) TELEPHONY SERVICE INVOCATION USING SERVICE DESCRIPTORS

(75) Inventors: Vicki Colson, Tavernier, FL (US); Thomas Creamer, Boca Raton, FL (US); Peeyush Jaiswal, Boca Raton, FL (US); Moore Victor, Lake City, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/111,532

(22) Filed: Apr. 29, 2008

(65) Prior Publication Data

US 2008/0267374 A1 Oct. 30, 2008

Related U.S. Application Data

(63) Continuation of application No. 10/324,894, filed on Dec. 20, 2002, now Pat. No. 7,386,107.

(51) Int. Cl.
*H04M 3/42* (2006.01)
*H04M 7/00* (2006.01)

(52) U.S. Cl. .......................... 379/201.02; 379/201.05; 379/201.12; 379/207.02; 379/221.09

(58) Field of Classification Search .............. 379/88.01, 379/201.01, 201.02, 201.05, 201.12, 207.02, 379/221.08–221.13
See application file for complete search history.

(56) References Cited

U.S. PATENT DOCUMENTS

| 4,899,373 A | 2/1990 | Lee et al. |
|---|---|---|
| 5,325,421 A | 6/1994 | Hou et al. |
| 5,502,759 A | 3/1996 | Cheng et al. |
| 5,661,782 A | 8/1997 | Bartholomew et al. |
| 5,696,815 A | 12/1997 | Smyk |
| 5,724,412 A | 3/1998 | Srinivasan |
| 5,754,633 A | 5/1998 | Levy |
| 5,757,900 A | 5/1998 | Nagel et al. |
| 5,826,185 A | 10/1998 | Wise et al. |
| 5,835,570 A | 11/1998 | Wattenbarger |
| 5,850,435 A | 12/1998 | Devillier |
| 5,854,975 A | 12/1998 | Fougnies et al. |
| 5,864,612 A | 1/1999 | Strauss et al. |
| 5,872,834 A | 2/1999 | Teitelbaum |
| 5,905,774 A | 5/1999 | Tatchell et al. |
| 5,953,399 A | 9/1999 | Farris et al. |
| 6,038,305 A | 3/2000 | McAllister et al. |
| 6,088,433 A | 7/2000 | Culli et al. |
| 6,130,941 A | 10/2000 | Nimmagadda et al. |
| 6,212,262 B1 | 4/2001 | Kamel |
| 6,226,366 B1 | 5/2001 | Bala et al. |

(Continued)

*Primary Examiner*—Harry S Hong
(74) *Attorney, Agent, or Firm*—Akerman Senterfitt

(57) ABSTRACT

A method of providing telephony services can include receiving a request to query a subscriber information data store to determine service description information for a call. The service description information can specify at least one telephony service associated with a subscriber for use in processing the call. The method further can include querying the subscriber information data store to determine the service description information, receiving the service description information from the subscriber information data store, and providing the service description information to a telephony service node to implement a telephony service specified by the service description information with respect to the call.

9 Claims, 2 Drawing Sheets

U.S. PATENT DOCUMENTS

| | | |
|---|---|---|
| 6,229,880 B1 | 5/2001 | Reformato et al. |
| 6,282,274 B1 | 8/2001 | Jain et al. |
| 6,324,271 B1 | 11/2001 | Sawyer et al. |
| 6,397,059 B1 | 5/2002 | Vance et al. |
| 6,430,276 B1 | 8/2002 | Bouvier et al. |
| 6,438,590 B1 | 8/2002 | Gartner et al. |
| 6,452,923 B1 | 9/2002 | Gerszberg et al. |
| 6,574,323 B1 | 6/2003 | Manuel et al. |
| 6,603,843 B1 | 8/2003 | Hagemann |
| 6,628,765 B1 | 9/2003 | Bangs et al. |
| 6,956,935 B2 | 10/2005 | Brown et al. |
| 7,158,821 B2 | 1/2007 | Roux et al. |
| 7,386,107 B2 * | 6/2008 | Colson et al. .......... 379/201.02 |
| 2002/0159571 A1 | 10/2002 | Stock |
| 2004/0017898 A1 | 1/2004 | Reynolds |

* cited by examiner

TELEPHONY SERVICE INVOCATION USING SERVICE DESCRIPTORS

CROSS REFERENCE TO RELATED APPLICATIONS

This application is a continuation of, and accordingly claims the benefit from, U.S. patent application Ser. No. 10/324,894, now issued U.S. Pat. No. 7,386,107, which was filed in the U.S. Patent and Trademark Office on Dec. 20, 2002.

BACKGROUND OF THE INVENTION

1. Technical Field

This invention relates to the field of telephony and, more particularly, to providing telephony services to subscribers.

2. Description of the Related Art

The delivery of most telephony services and features is tied to the directory number of a calling party or a called party. In fact, nearly all of the activities performed by a conventional telephony system, whether a circuit-switched telephone network such as the public switched telephone network (PSTN) or a packet-switched telephony system, are based on such directory numbers or network addresses as may be the case. The dialed directory number can be referred to as the DNIS in reference to directory number identification service, a service which identifies for a receiving party the number dialed by a calling party. The directory number of the calling party can be referred to as an ANI in reference to automatic number identification, the service which provides the receiving party with the directory number of the calling party.

When a calling party initiates a call to a receiving party, the DNIS and the ANI can be used to authenticate the call. Authentication can include tasks such as finding the ANI in a list of authorized subscribers and ensuring that the DNIS is valid. Taking another example, the switching of calls to and from a subscriber also can be achieved through the use of the subscriber's directory number. That is, if a calling party places a call to a receiving party, the call can be routed to the receiving party based on an area code and/or an exchange code of the DNIS.

The reliance of conventional telephony systems on the DNIS and ANI not only determines how features and services are to be implemented and delivered, but also dictates the mode of operation of other portions of the telephony system. In consequence, services provided by conventional telephony systems are tightly linked to the DNIS and ANI. For example, billing, interactive voice response functions, call routing, call authentication, and subscriber information retrieval are predicated upon the DNIS and the ANI.

Given the mobile nature of today's society, however, providing subscribers with telephony services according to the DNIS and/or the ANI can have disadvantages. For example, as a subscriber moves from one location to another, the subscriber may utilize telephony equipment associated with a directory number and account that is different from that of the "mobile" subscriber. As a result, the subscriber can be blocked from accessing particular telephony services which typically are available to the subscriber when calling from a home or another number used by that subscriber. Moreover, if a subscriber does access one or more telephony services from a different number, for example while traveling, the account associated with the number from which the subscriber has called typically is billed rather than the subscriber.

SUMMARY OF THE INVENTION

The invention disclosed herein provides a solution for activating telephony services for subscribers. The present invention can provide telephony services based upon identifiers which are associated with subscriber information within a telephony data store. According to the present invention, telephony services can be provided to a subscriber for a given call without relying upon a called number and/or a calling number. In consequence, the delivery of telephony services including, but not limited to, billing, call routing, call forwarding, voice mail, call redirect, and information retrieval can be predicated upon a subscriber identity rather than the called number or the calling number.

One aspect of the present invention can include a method of providing telephony services. The method can include receiving a request to query a subscriber information data store to determine service description information for a call. The service description information can specify at least one telephony service associated with a subscriber for use in processing the call. The subscriber information data store can be queried to determine the service description information.

The service description information can be received from the subscriber information data store. If additional items of subscriber information are received from the subscriber information data store in relation to the call, the service description information can be parsed from the additional items of subscriber information. Accordingly, the service description information can be provided to a telephony service node to implement one or more telephony services specified by the service description information with respect to the call.

The telephony service node can implement one or more telephony services specified by the service description information without using origination point information or termination point information for the call. Still, the method can include adding service description information to a subscriber entry in the subscriber information data store. For example, the service description information can be appended to a subscriber name portion of the subscriber entry.

Within the telephony service node, the call can be received as well as the associated service description information. The service description information can be matched with at least one telephony service available in the telephony service node for processing the call. Accordingly, the call can be processed in accordance with the determined telephony service.

Another aspect of the present invention can include a method of providing telephony services in a telephony service node. The method can include receiving a call and associated service description information, wherein the service description information is determined from a subscriber information data store. The service description information can be matched with at least one telephony service available in the telephony service node for processing the call. The call can be processed in accordance with the one or more determined telephony services. Thus, the telephony service node can implement the telephony services specified by the service description information without using origination point information or termination point information for the call. Notably, the service description information can be added to a subscriber entry in the subscriber information data store. As noted, the service description information can be appended to a subscriber name portion of the subscriber entry.

Another aspect of the present invention can include a method of providing telephony services in a telephony service node including receiving a call and initiating a query to a subscriber information data store to determine service description information for the call. The service description information can specify at least one telephony service associated with a subscriber for use in processing the call. The service description information can be received from the subscriber information data store. The service description information can be matched with at least one telephony service available in the telephony service node for processing the call. The call then can be processed in accordance with the determined one or more telephony services.

As noted, the matching step can determine the telephony service for processing the call without reference to origination point information or termination point information for the call. Additionally, the service description information can be added to a subscriber entry in the subscriber information data store by, for example, appending the service description information to a subscriber name portion of the subscriber entry.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

The invention disclosed herein provides a method and apparatus for activating telephony services for subscribers. More particularly, the present invention can provide telephony services based upon a service descriptor which can be associated with subscriber information within a telephony data store such as a Line Information Data Base (LIDB). Accordingly, telephony services can be provided to a subscriber for a given call based upon the subscriber's identity without relying upon termination information such as the called number or address and/or origination information such as the calling number or address.

Figure 1:
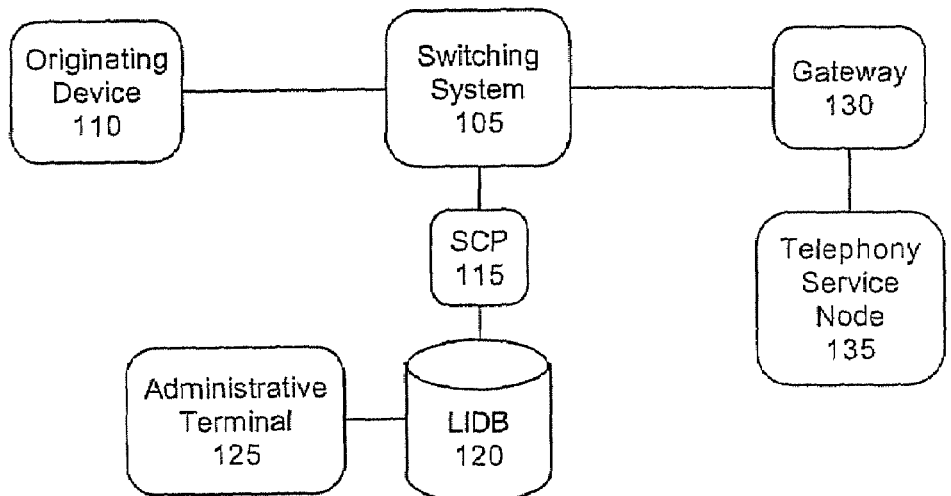
FIG. 1 is a schematic diagram illustrating a telephony system in accordance with the inventive arrangements disclosed herein.

FIG. 1 depicts a telephony system 100 in accordance with the inventive arrangements disclosed herein. The system 100 can be implemented as a circuit-switched telephony network such as the public switched telephone network (PSTN). Accordingly, the system 100 can include various nodes providing circuit-switched transfer of voice data and packet-switched transfer of signaling data. For example, a switching system 105 can provide access to an originating device 110, which can be accessed by a subscriber to initiate a call. The telephony system 100 also can include one or more signaling transfer points (not shown) for routing signaling data, such as Signaling System 7 (SS7) information, between the switching system 105 and other switching systems. A service control point (SCP) 115 can provide an interface to databases and other data retrieval services in the telephony system. The signaling transfer points and the SCP 115, at least in part, form the signaling network in the PSTN supporting call control functions such as call set up, call maintenance, and call tear down.

The SCP 115 can provide an interface though which the LIDB 120 can be queried. As should be appreciated by those skilled in the art, the LIDB 120 can be maintained by a telephone carrier, for example at a central office. The LIDB 120 can store information such as a service profile, name, address, credit card validation information, and the like for subscribers. For example, the LIDB 120 can store caller identification information necessary for the implementation of the "Caller ID" telephony service.

According to the present invention, the LIDB 120 can be provisioned, for example via the administrative terminal 125, so that a service descriptor can be appended to subscriber names stored therein. More particularly, a service descriptor which can be associated with one or more telephony services can be added to the name field of subscriber entries within the LIDB 120. Accordingly, the subscriber, based upon the subscriber identity, can be provided with one or more telephony services which are associated with the service descriptor rather than with origination and/or termination information.

The gateway 130 can be communicatively linked to the switching system 105 and provide an interface to the telephony service node 135. The telephony service node 135 can provide any of a variety of call processing functions. For example, the telephony service node 135 can provide interactive voice response functions including dual tone multi-frequency recognition, voice recognition, and text-to-speech processing. The telephony service node 135 further can provide other call processing functions such as call routing, voice activated dialing, call forwarding, voice mail, call redirect, information retrieval, and the like.

According to one aspect of the present invention, the telephony service node 135 can include a telephony application platform operating within a packet-switched network environment. The gateway 130 can provide an interface between the circuit-switched network and the packet-switched network for both telephony signaling data as well as voice communications. Accordingly, the gateway 130 can perform translations between directory numbers and network addresses for connecting calls with various voice processing application services. Notably, the telephony service node 135 can be included within a larger packet-switched telephony network.

The telephony service node 135 also can be implemented as a programmable circuit-switched call processing platform. In that case, the telephony service node 135 can be linked directly with the switching system 105 (not shown). Accordingly, the examples disclosed herein have been provided for purposes of illustration only. As such, the present invention is not limited to the use of one particular type of telephony service node. Rather, the telephony service node 135 can be implemented and function within either a packet-switched or a circuit-switched telecommunications environment using suitable interface mechanisms to the switching system 105.

In operation, a subscriber can originate a call with the switching system 105 using the originating device 110. The call can be directed, that is the calling number or address can correspond to, an application program or extension within the telephony service node 135. In processing the call, one or more call triggers associated with the call can be identified within the switching system 105. The call trigger or triggers can cause the switching system 105 to initiate a query to the SCP 115, which in turn can query the LIDB 120 for subscriber information. The LIDB 120 can search for subscriber information corresponding to the calling number of the call. The subscriber information, including the service descriptor, can be provided back to the SCP 115, to the switching system 105, and on to the telephony service node 135 via the gateway 130. Accordingly, the telephony service node 135 can implement a call processing function and/or application indicated by the service descriptor.

Although the system of FIG. 1 was described largely within the context of a circuit-switched telephony environment, those skilled in the art will recognize that the present invention also can be implemented within the context of a packet-switched or Internet Protocol (IP) based telephony environment. For example, a subscriber can initiate a call over a packet-switched network which can include appropriate processing nodes and/or interfaces for initiating SCP and/or LIDB queries.

Figure 2:
FIG. 2 is an exemplary data entry for a subscriber typically found within a subscriber information data store.

FIG. 2 is an exemplary data entry 200 for a subscriber which typically is found within a LIDB as was shown in FIG. 1. Although data entries within the LIDB can include significantly more information than shown, the data entry 200 can include a subscriber name 205 and a subscriber number 210 associated with the subscriber name 205. The subscriber number 210 corresponds to the calling number for a call. Accordingly, a query using the subscriber number 210 as a parameter can determine the associated subscriber name 205 for a given call. The subscriber name 205 can be provided to the called party in addition to the subscriber number 210.

Figure 3:
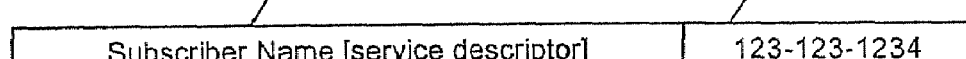
FIG. 3 is an exemplary data entry for a subscriber which can be stored within a subscriber information data store in accordance with the present invention.

FIG. 3 is an exemplary data entry 300 for a subscriber which can be stored within the LIDB in accordance with the inventive arrangements disclosed herein. The data entry 300 includes a subscriber name 305 and an associated subscriber number 310. Notably, a service descriptor has been appended to the subscriber name 305. The service descriptor can be a string of one or more characters and/or symbols. The service descriptor can represent one or more telephony services for which the subscriber has been registered or approved to received.

Figure 4:
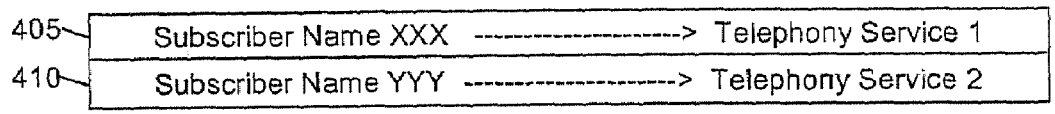
FIG. 4 is an excerpt from an exemplary mapping of subscriber information to telephony services in accordance with the present invention.

FIG. 4 is an excerpt from an exemplary mapping 400 of subscriber information to telephony services in accordance with the present invention. The mapping 400 can be located within the telephony service node of FIG. 1. Accordingly, when a call or call request specifying a subscriber name and/or a service descriptor is received, the telephony service node can match the received call request with one or more services corresponding to the received service descriptor.

As shown, the mapping 400 includes an entry 405 and an entry 410. Each entry can specify a subscriber name with an appended service descriptor. In another embodiment of the present invention, only the service descriptor need be stored. In any case, the service descriptor can be associated with one or more telephony services. More than one telephony service can be associated with each telephony service descriptor.

The service descriptors can be implemented such that each like service descriptor is associated with a given set of one or more telephony services. For example, each bit position of a given service descriptor can correspond to a given telephony service and indicate whether that service is available for use. According to another aspect of the present invention, each service descriptor can be unique such that the set of telephony services associated with the subscriber name also can be unique to that subscriber. Thus, service descriptor "XXX" of entry 405 can be associated with telephony service 1 or a set of telephony services. The service descriptor "YYY" of entry 410 can be associated with telephony service 2, or another set of telephony services.

It should be appreciated, however, that the association of service descriptors, telephony services, and/or subscriber names can be performed using any of a variety of data storage and association mechanisms. For example, the mapping data can be specified as a table, as a linked list, or as a database.

Figure 5:
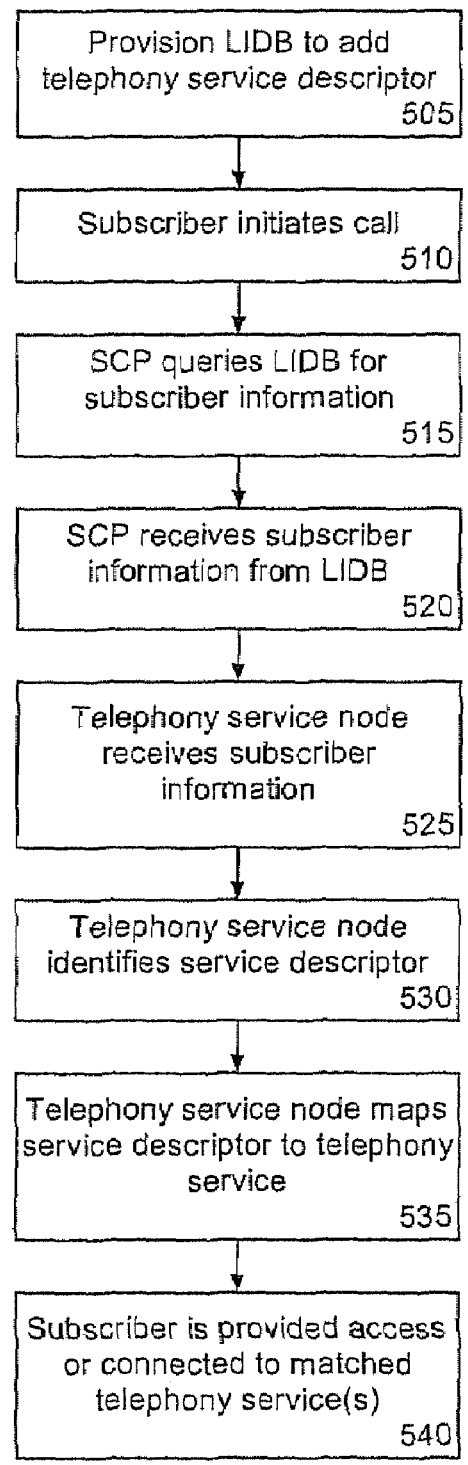
FIG. 5 is a flow chart illustrating a method of call processing according to the present invention.

FIG. 5 is a flow chart illustrating a method 500 of delivering a telephony service as performed by the system of FIG. 1. The method can begin in step 505 where the LIDB can be provisioned to add or append service descriptors to names of one or more subscriber entries. As noted, this can be performed using an administrative terminal or computer system designated for administering or maintaining the LIDB. In step 510, a subscriber can initiate a call using suitable customer premise equipment, whether circuit-switched or packet-switched customer premise equipment.

In step 515, an SCP can query the LIDB for subscriber information. More particularly, the initiated call can be processed in a telephony switching system which can determine that a query to an SCP for further information is necessary. Accordingly, the switching system can send the query to the SCP, which in turn can query the LIDB as indicated. The SCP can query the LIDB by including information such as the calling number or address within the query, such that the LIDB can retrieve subscriber information corresponding to the received call. The LIDB, having identified subscriber information for the call, including a service descriptor, can provide the call information to the SCP which receives the call information in step 520.

In step 525, the telephony service node can receive the call information which can be routed from the SCP through one or more intermediate switching points as well as switching systems as may be required. In step 530, the telephony service node can identify the service descriptor from the received subscriber information. In step 535, the telephony service node can match the identified service descriptor from the subscriber information with one or more telephony services. As noted, the telephony service node can store associations of service descriptors and telephony services which can be enabled or provided to process a call associated with a particular subscriber.

In step 540, the telephony services which are associated with the identified service descriptor can be activated or made available to process the call. For example, one or more application program implementations of telephony services associated with the service descriptor can be executed. Accordingly, any of a variety of telephony services can be provided to process the call including interactive voice response services, directory services, call routing, and the like.

It should be appreciated that the present invention, although described with reference to a particular embodiment, can be implemented in any of a variety of different configurations. For example, one or more of the particular functions described herein with reference to the SCP and the telephony service node, that is subscriber data retrieval functions and the providing of telephony services can be combined into a single more complex processing node.

Additionally, depending upon the particular configuration of the present invention, the telephony node, for example the SCP, which retrieves the subscriber information can retrieve the subscriber name and/or service descriptor only, or the subscriber name, the service descriptor, as well as additional subscriber information. Accordingly, if the subscriber data retrieval node retrieves more information than is required, the SCP can parse the subscriber information to determine the subscriber name and/or service descriptor to be provided to the telephony service node. If more information than is needed by the telephony service node is received, for example from the SCP, the telephony service node can parse the received subscriber information to determine the subscriber name and/or the service descriptor.

The invention disclosed herein provides a solution for activating telephony services for subscribers according to a service descriptor which can be added to subscriber entries within a telephony data store. Accordingly, through the present invention, telephony services can be provided to subscribers by the telephony service node without a reliance upon origination and/or termination information. Thus, telephony services can be provided based upon subscriber identities, thereby facilitating personalized telephony service provisioning.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A computer-readable storage medium, having stored thereon a computer program having a plurality of code sections executable by a computer for causing the computer to perform the steps of:
provisioning a subscriber information data store by appending a service descriptor to a subscriber profile item other than call origination point information and call termination point information, the service descriptor representing at least one telephony service for which the subscriber has been registered;
at a subscriber data retrieval node, receiving a call request and a caller identifier from a subscriber;
querying the subscriber information data store with said caller identifier to determine the subscriber profile item and the appended service descriptor;
receiving the service descriptor at the subscriber data retrieval node from the subscriber information data store;
providing the service descriptor to a telephony service node;
mapping the service descriptor to the at least one telephony service represented by the service descriptor; and
providing the subscriber with an access to the at least one telephony service.

2. The computer-readable storage medium of claim 1, wherein the subscriber profile item is the name of the subscriber.

3. The computer-readable storage medium of claim 1, wherein the call origination point information includes a calling number.

4. The computer-readable storage medium of claim 1, wherein the call termination point information includes a called number.

5. The computer-readable storage medium of claim 1, further comprising:
if the subscriber data retrieval node retrieves information more than the subscriber profile item and/or the service descriptor, parsing the information to determine the subscriber profile item and/or the service descriptor.

6. A computer-readable storage medium, having stored thereon a computer program having a plurality of code sections executable by a computer for causing the computer to perform the steps of:
provisioning a subscriber information data store by appending a service descriptor to a subscriber profile item other than call origination point information and call termination point information, the service descriptor representing at least one telephony service for which the subscriber has been registered;
within the telephony service node, receiving a service descriptor determined from the subscriber information data store based on a caller identifier upon receiving a call from a subscriber;
matching the service descriptor with the at least one telephony service available in the telephony service node for processing the call; and
providing the subscriber with an access to the at least one telephony service.

7. The computer-readable storage medium of claim 6, wherein the subscriber profile item is the name of the subscriber.

8. The computer-readable storage medium of claim 6, wherein the call origination point information includes a calling number.

9. The computer-readable storage medium of claim 6, wherein the call termination point information includes a called number.

* * * * *